United States Patent [19]

Taniguchi et al.

[11] Patent Number: 5,051,992
[45] Date of Patent: Sep. 24, 1991

[54] DATA LINK CONTROL METHOD AND SYSTEM FOR INTEGRATED SERVICES DIGITAL NETWORK

[75] Inventors: Hidenobu Taniguchi, Machida; Satoshi Miyazaki, Sagamihara; Sinichi Kouyama, Hiratsuka; Tatsuo Kawatobi, Yokohama; Keizou Mizuguchi, Kanagawa; Kazuo Yagyu, Hiratsuka, all of Japan

[73] Assignee: Hitachi, Ltd., Tokyo, Japan

[21] Appl. No.: 433,198

[22] Filed: Nov. 8, 1989

[30] Foreign Application Priority Data

Nov. 11, 1988 [JP] Japan .................. 63-283599

[51] Int. Cl.[5] .............................. H04J 3/12; H04J 3/24
[52] U.S. Cl. .................................. 370/110.1; 370/94.1
[58] Field of Search ......................... 370/94.1, 110.1; 379/93, 94, 96

[56] References Cited

U.S. PATENT DOCUMENTS

| | | | |
|---|---|---|---|
| 4,722,082 | 1/1988 | Furuya et al. | 370/110.1 |
| 4,812,839 | 3/1989 | Okada et al. | 370/103 |
| 4,821,264 | 4/1989 | Kim | 370/94.1 |
| 4,866,703 | 9/1989 | Black et al. | 370/110.1 |
| 4,878,216 | 10/1989 | Yunoki | 370/110.1 |

Primary Examiner—Benedict V. Safourek
Assistant Examiner—H. Kizou
Attorney, Agent, or Firm—Antonelli, Terry, Stout & Kraus

[57] ABSTRACT

There is a communication system comprising: an integrated services digital network (ISDN) having a plurality of information channels (Bch) and at least one control channel (Dch); a CPU (host computer) connected to said ISDN through a communication control processor (CCP); and a plurality of packet terminals connected to the ISDN. In the communication system, when a call request from the CPU or an incoming call request from one of the packet terminals is input to the CCP, if the B channel data link connection or the D channel data link connection for the packets has already been established between the CCP and the ISDN, the CCP selects the channel data link connection as a channel for communication with the packet terminal and multiplexes a plurality of calls to the same channel even if the other space B channels exist.

6 Claims, 9 Drawing Sheets

DATA LINK CONTROL METHOD AND SYSTEM FOR INTEGRATED SERVICES DIGITAL NETWORK

BACKGROUND OF THE INVENTION

The present invention relates to data link control method and system for an ISDN (Integrated Services Digital Network) and, more particularly, to a control method and system for multiplexing a call in the form of an originating call or incoming call by a communication control processor (CCP) connected to the ISDN through subscribers' lines to a data link connection of a D or B channel.

Hitherto, in a digital switching network, in the case where a host computer (hereinafter, referred to as a CPU) connected to a communication control processor (hereinafter, referred to as a CCP) connected to the switching network through a plurality of subscribers' lines and a packet terminal connected to the switching network through one subscriber's line communicate, upon originating a call, the CCP selects, for instance, a subscriber's line in which the number of calls which have been set (call multiplicity) is smallest or the subscriber's line in which a queuing (queue length) of the packet to be transmitted is shortest and multiplexes a new call to the selected subscriber's line. On the other hand, according to JP-A-61-48260, there has been proposed a system in which means for counting a residual amount of data blocks (packets) which are being transmitted or are in the transmission waiting mode is provided for every line, the CCP predicts the time until the end of data transmission of each line on the basis of a data transfer rate of each line and the counted residual data amount, and distributes a transmission data block which has been newly generated to the line in which the predicted time is shortest.

In recent years, the ISDN (Integrated Services Digital Network) having at least one control channel (hereinafter, referred to as a D channel) and a plurality of information channels (hereinafter, referred to as B channels) has been being put into practical use as a multi-dimensional information communication service network which can cheaply transmit various media such as audio, image, digital data, and the like at a higher speed as compared with the existing telephone network or digital switching network. Although the D channel itself of the ISDN can be also used as an information channel, the control, such as selection of a transfer mode (line switching/packet switching) of the information channels, designation of the kind of information channel to be used and the channel number, and the like, can be also executed by using the D channel. The channel numbers i of the B channels are set to 1 to 2 in the basic interface of the ISDN, while they are set to 1 to 23 in the primary rate interface. On the other hand, in the ISDN, the D channel comprises a channel for transmission of a control signal (hereinafter, referred to as a $D_1$ channel) and a channel for transmission of a packet (hereinafter, referred to as a $D_2$ channel). The $D_2$ channel can be used as one of the information channels.

In the ISDN, if the transfer mode of either the circuit switching or the packet switching is selected with respect to one information channel for an originating call/incoming call, the transfer mode of the above information channel cannot be changed to another mode for a period of time when such a call is set. Therefore, for instance, when calls to request switching of the packets are sequentially generated, if the space information channel in which the waiting time is shortest is sequentially assigned to the new call, all of the information channels will become occupied as channels for switching of the packets. Thus, there is a problem that a call which needs the circuit switching which occurs after that cannot be communicated.

SUMMARY OF THE INVENTION

It is an object of the present invention to provide data link control method and system in the ISDN in which, when an originating call of the same mode (for instance, the packet switching mode) is continuously generated, in order to enable the system to cope with a call of another mode (for example, the line switching mode) which will be generated after that as much as possible, the information channels are assigned to those calls by such a method as to leave unused information channels.

Another object of the invention is to provide a control method and a communication system for completing the establishment of the network connection for an originating call or incoming call in a short time.

Still another object of the invention is to provide a multiplexing method and system of calls to the data link connection in the ISDN in which a transmission message can be transmitted by a reduced number of packets.

To accomplish the above objects, the invention is characterized in that a CCP (to which a CPU is connected) to communicate with a plurality of terminal equipments through the ISDN checks a number of calls in each used channel, that is, the call multiplicity of the B channels or D channel, in which the data link connection has already been established for an incoming call or a call to request packet communication from the terminal equipment or for an originating call to the terminal equipment, and if the channel whose call multiplicity is equal to or less than a predetermined upper limit value exists, such a channel is assigned to the above call even if other space channels exist. The upper limit value of the call multiplicity, i.e. the upper limit of the number of calls in each channel, is preset to a value in a range such that the deterioration in throughput due to the multiplexing can be allowed between the application programs of the CPU and the terminal equipment which communicate with each other.

The calling operation in the CCP is executed in response to a network connection establishment request message from the CPU. At this time, if it is necessary to newly establish a data link connection to either one of the channels between the CCP and the ISDN, the CCP executes the transmitting and receiving procedures of control messages to establish the data link between the CCP and the ISDN and, thereafter, sends a call request message (CR) to the data link which was established due to this. When the network connection establishment request has been sent from the CPU, if the established data link exists and the call multiplicity of such a data link is equal to or less than the upper limit value, the data link establishing procedure is omitted and the call request message can be immediately transmitted to the existing data link. Upon reception of a call request message CR, the ISDN sends a call setting request message SETUP to the destination terminal equipment through the control channel in order to establish a data link between the destination terminal equipment serving as a communication partner of the CPU and the ISDN. The SETUP message includes an identifier to identify the information channel which is used for the subsequent communication between the ISDN and the terminal equipment (or CCP) and information such as maximum packet length and the like. When the information channel which is used between the ISDN and the destination terminal equipment is determined and the data link is established in such a channel, the ISDN sends an incoming call message CN through the data link. When the terminal equipment sends a call accepted message in response to the CN, the ISDN sends a call connected message to the CCP, so that the system is set into a state in which the communication can be executed in the packet switching mode between the CCP and the terminal equipment.

After the data link connection has been established between the terminal equipment and the ISDN, the incoming calling operation in the CCP is executed in response to the SETUP message which is sent from the ISDN to the CCP.

According to the invention, when the CCP receives the network connection establishment request message from the CPU or the SETUP message from the ISDN, the CCP refers to the maximum packet length and the using channel ID which are designated by those messages.

If the maximum packet length which is needed by the call is equal to or less than the allowable packet length (256 octets in the existing ISDN) in the packet communication by the D channel and the channel ID designates the D channel or, although it designates the B channels, if a change of the designated channel is permitted, the CCP checks the foregoing call multiplicity with respect to the D channel and, if possible, the above call is multiplexed to the D channel. If the designated channel is the D channel and the requested maximum packet length is larger than the allowable packet length of the D channel, and if the designated channel can be changed, the CCP assigns the B channel in which the multiplicity does not reach the upper limit value and in which the data link connection has already been established to the above-mentioned call. In the case where the D channel is used as an information channel, since the maximum frame length is restricted (260 octets in the existing ISDN), as mentioned above, the channel in which the maximum packet length requested by the call is equal to or larger than a predetermined value (256 octets) is not multiplexed to the D channel. Due to this, the process to divide the transmission frame into a plurality of packets or the process to assemble the reception packet to the message which is executed by the CCP can be reduced and the transmission/reception processing operation can be executed at a high speed.

According to the invention, the call for the packet communication is multiplexed to the information channel by a method such as to leave space information channels which are used for circuit switching as much as possible, so that the function for the multi-dimensional information communication by the ISDN is not lost.

The foregoing and other objects, advantages, manner of the operation and novel features of the present invention will be understood from the following detailed description when read in conjunction with the accompanying drawings.

DESCRIPTION OF THE PREFERRED EMBODIMENTS

Figure 1:
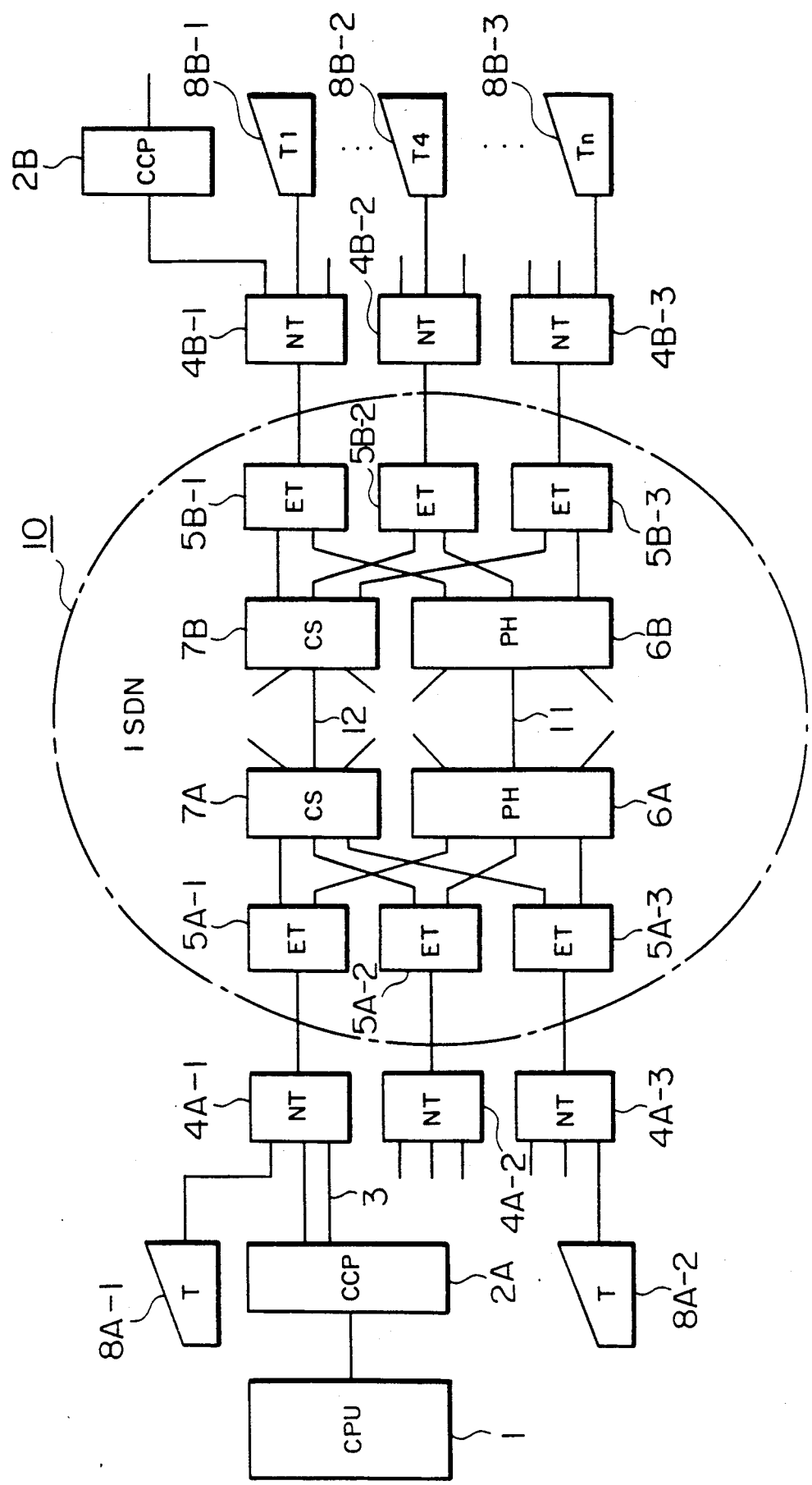
FIG. 1 is a diagram showing an example of a construction of an ISDN system to which the present invention is applied.

FIG. 1 is a diagram showing an example of an ISDN system to which the present invention is applied. In the diagram, reference numeral 10 denotes an ISDN including a plurality of exchange terminal equipments (ETs) 5A-1 to 5B-3, packet handlers (PHs) 6A and 6B, and circuit switching systems (CS) 7A and 7B. Reference numerals 4A-1 to 4B-3 denote network terminal equipments (NTs) connected to the exchange terminal equipments 5A-1 to 5B-3, respectively. Terminal equipments 8A-1 to 8B-3 and CCPs 2A and 2B are connected to the NTs through subscribers' lines 3. The subscribers' lines 3 are formed with a plurality of information channels $B_i$ and one control channel D by time-sharing multiplexing. The data transmitted from the terminal equipment 8 and CCP 2 to either one of the channels is received by the ET 5 through the ET 5. In the reception data, the NT 4 gives the packet switching data to the PH 6 and gives the line switching data to the CS 7. The packet received by the PH 6A of one station is transmitted through a line 11 to the PH 6B of the station to which a destination equipment belongs. The packet is then received by the destination equipment via the ET 5B and the NT 4B. In a manner similar to the above, the line switching data received by the CS 7A of one station is transmitted through the line 12 to the CS 7B of the station to which the destination equipment belongs. The line switching data is then received by the destination equipment via the ET 5B and the NT 4B.

Figure 2:
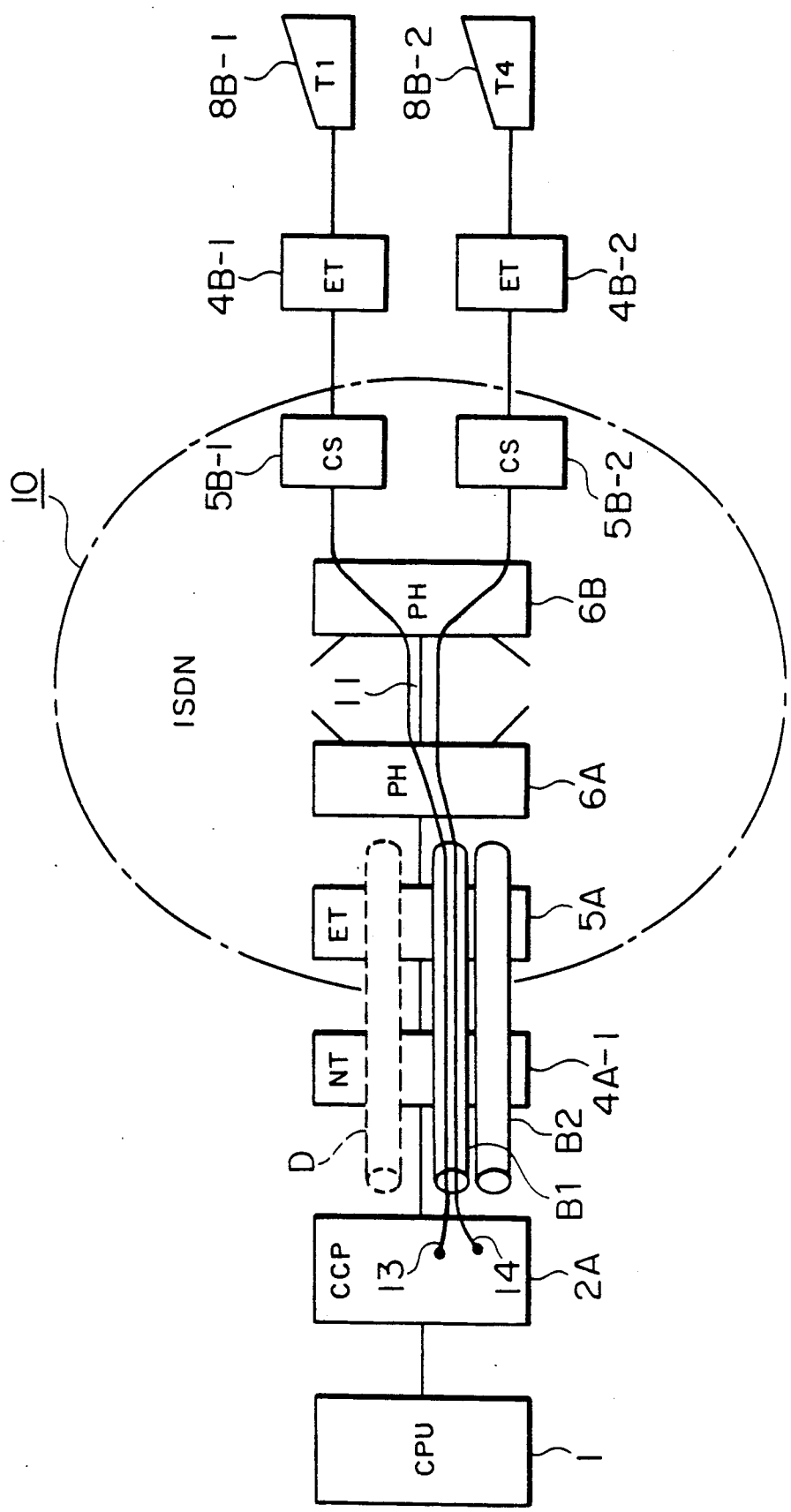
FIG. 2 is a diagram schematically showing the multiplexing of a call in the ISDN system.

FIG. 2 is an explanatory diagram about the establishment of the data link connection according to the invention in the case where a CPU 1 connected to the CCP 2A and the two terminal equipments 8B-1 and 8B-2 in FIG. 1 communicate with each other. In the example, it is assumed that each of the CCP 2A and the PH 6A has the basic interface of the ISDN and two information channels $B_1$ and $B_2$ each having a data transmission rate of 64 kbits/sec and one control channel D having a data transmission rate of 16 kbits/sec exist between the CCP 2A and the PH 6A. If a primary rate interface is applied in place of the above basic interface, the number of information channels can be increased to 23 or 24.

As shown in FIG. 2, it is assumed that the data link has already been established in the information channel $B_1$ between the CCP 2A and the PH 6A and a call 13 (corresponding to the network connection) has been set between the CCP 2A and the terminal equipment ($T_1$) 8B-1. In this state, when a request to set a call 14 between the CCP 2A and the terminal equipment ($T_4$) 8B-2 is newly generated, in the present invention, the CCP multiplexes the new call to the $B_1$ channel in spite of the fact that the non-used information channel $B_2$ exists.

Figure 3:
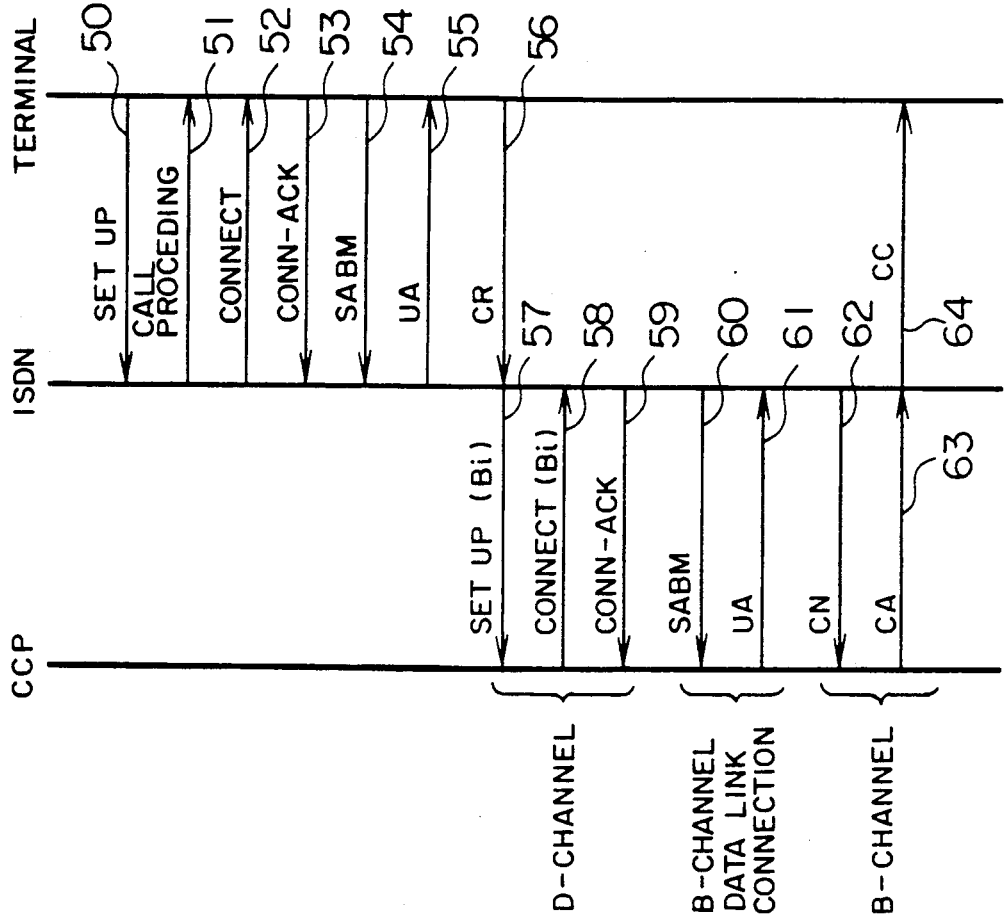
FIG. 3 is a diagram showing a message sequence among a CCP, an ISDN, and a terminal equipment in the case of calling from the CCP.

FIG. 3 shows a message sequence between the CCP 2A and the ISDN (PH 6A) and between the ISDN (PH 6B) and the terminal equipment 8B-1 in the case where the CCP 2A newly establishes a data link and sets a call in response to the connection establishment request from the CPU 1. The CCP sends the SETUP message to request to set a call to the ISDN through the control channel D (step 30).

Figure 5:
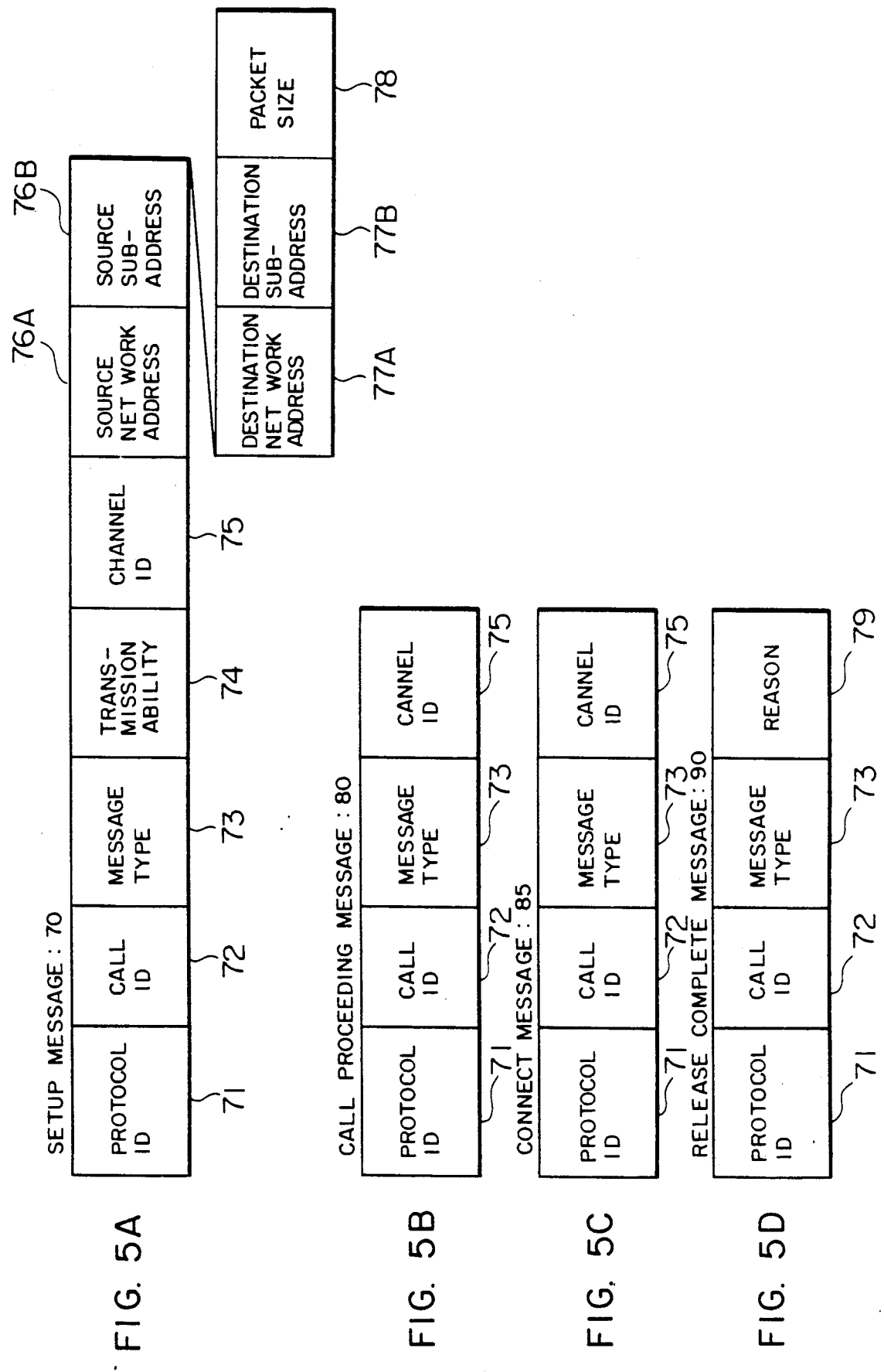
FIGS. 5A to 5D are diagrams showing formats of main control messages which are used in the data link control.

As shown in FIG. 5A, a SETUP message 70 includes a field 71 indicative of a protocol ID, a field 72 indicative of a call ID, a message type field 73 including a code indicating that the message is the SETUP message, a transmission ability field 74 indicating whether the communication which is executed in the call relates to the packet switching mode or the circuit switching mode, and a field 75 indicative of the ID of the channel which is used. The SETUP message which is sent from the ISDN to the destination equipment in step 37, which will be explained hereinlater, further includes a field 76A indicative of the address of the connecting point between the equipment on the transmitting side (in the example, the CCP 2A) and the network, a field 76B indicative of the address of the equipment on the transmitting side, a field 77A indicative of the address of the connecting point between the destination equipment (in the example, the terminal 8B-1) and the network, a field 77B indicative of the address of the destination equipment and a field 78 indicative of the maximum length of the packet which is transmitted by the call.

Upon reception of the SETUP message, the ISDN returns a CALL PROCEEDING message 80 shown in FIG. 5B to indicate that the call setting request has been accepted (step 31) and then transmits a CONNECT message 85 shown in FIG. 5c responsive to the SETUP message (step 32). Each of the messages 80 and 85 comprises a protocol ID field 71, call ID field 72, message type field 73, and channel ID field 75.

Upon reception of the CONNECT message 85, the CCP transmits a CONN-ACK message indicative of the acknowledgment of the CONNECT message 85 to the ISDN through the control channel (step 33). Thereafter, the CCP sends an SABM (Set Asynchronous Balanced Mode) message to establish the data link connection to the information channel (in the example, the $B_1$ channel) designated by the channel ID field 75 (step 34). When the ISDN returns an UA (Unnumbered Acknowledge) message in response to the SABM (step 35), this means that the data link has been established between the CCP and the ISDN.

After the CCP has received the UA massage, the CCP sends the CR (Call Request) message to set a call between the CCP and the destination terminal to the data link ($B_1$ channel) (step 36). The CR message includes a information corresponding to the contents of the fields 76A to 78 in FIG. 5A. Upon reception of the CR message, the ISDN transmits SETUP message comprising the fields 71 to 78 in FIG. 5A from the ISDN (PH 6B) to the destination terminal equipment through the D channel in order to establish a data link between the ISDN and the destination terminal 8B-1 (step 37). The data link is established between the ISDN and the terminal equipment 8B-1 by subsequently communicating the CONNECT message (step 38), CONN-ACK message (step 39), SABM message (step 40), and UA message (step 41) between the terminal and the ISDN. When the data link is established, the ISDN transmits a CN (Incoming Call) message to the terminal equipment via the data link (step 42). The terminal then returns a CA (Call Accepted) message indicative of the acception of the incoming call by the terminal (step 43). Upon reception of the CA message, the ISDN transmits a CC (Call Connected) message indicating that the call has been set to the CCP (step 44). Thus, the system is set to the state in which the packet communication can be executed between the CCP 2A and the terminal equipment 8B-1.

In the state in which the data link has been established in the $B_1$ channel by the calling operations mentioned above, when the CPU 1 subsequently sends a network connection establishment request message for communication with another terminal equipment 8B-2 to the CCP, the CCP omits the data link establishing procedure (steps 30 to 35) and sends the CR message to set a call between the CCP and the terminal equipment 8B-2 to the $B_1$ channel.

Figure 4:
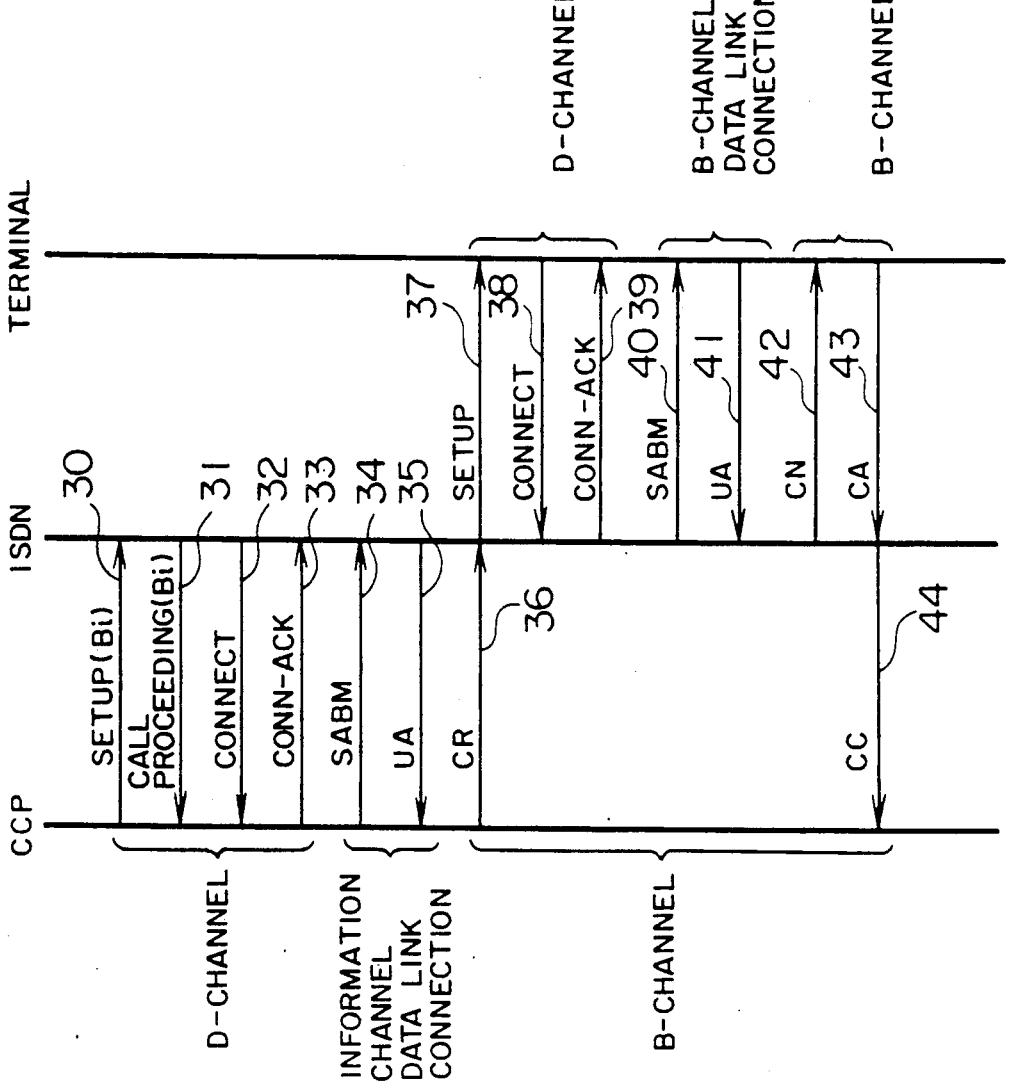
FIG. 4 is a diagram showing a message sequence among the CCP, the ISDN, and a terminal equipment in the case of calling from the terminal equipment.

FIG. 4 shows a message sequence in the case where the set request message SETUP of the call 13 for the packet communication with the CPU 1 is generated from the terminal equipment 8B-1. Steps 50 to 64 in FIG. 4 are similar to FIG. 5 except that the transmitting side equipment and the destination equipment are exchanged. In a state in which the call 13 has been set, if the terminal equipment 8B-2 transmits the SETUP message to the ISDN for the packet communication with the CPU 1, the call can be set between the CCP 2A and the ISDN in a form in which steps 60 to 61 in FIG. 4 are omitted.

Figure 6:
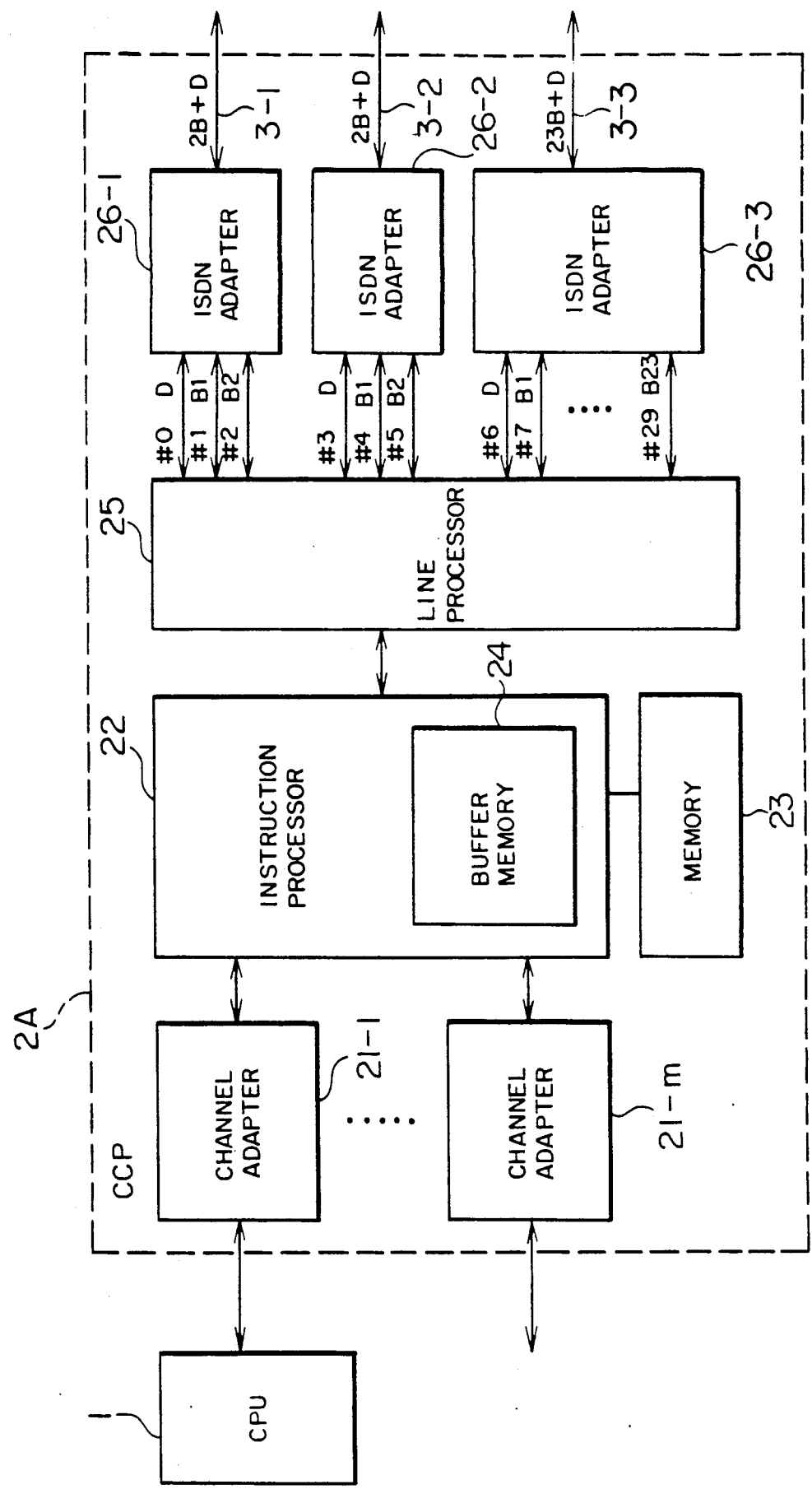
FIG. 6 is a diagram showing an example of a construction of the CCP.

FIG. 6 is a block diagram showing a construction of the CCP 2A. The CCP comprises a plurality of channel adapters 21-1 to 21-m serving as interfaces with the CPU, an instruction processor 22; a line processor 25 and a plurality of ISDN adapters 26-1 to 26-n provided in correspondence to the subscribers' lines. Each ISDN adapter 26 is connected to the line processor 25 through a plurality of signal lines which are independent in every channel. Line addresses (#0 to #29) are assigned to the signal lines. In the example of FIG. 6, each of the adapters 26-1 and 26-2 is based on the ISDN basic interface specifications having 2B+D channels. The adapter 26-3 is based on the primary rate interface specifications of the ISDN having 23B+D channels. The instruction processor 22 has a memory 23 to store control programs and various management tables, which will be explained hereinlater, and a transmission/reception buffer memory 24 to temporarily store reception data from the channel adapters 21 and line processor 25.

After the message data to be transmitted from the CPU 1 to the terminal equipment is temporarily stored into the buffer memory 24, it is supplied to the line processor 25 by the instruction processor 22 in the form of a packet having a header including a line address (in the example, either one of #0 to #29). The line processor 25 sends the packets to the signal line designated by the line address included in the header. The ISDN adapter 26 sends the packets received from the line processor 25 to the channels on the subscribers' lines 3 which ar formed by time-sharing multiplexing. On the contrary, the packets received by the ISDN adapter from the subscribers' lines are written into the buffer memory 24 through the line processor 25 and are formed into a message by the instruction processor 22. Thereafter, the message is transmitted to the CPU 1 through the channel adapter 21.

Figure 7:
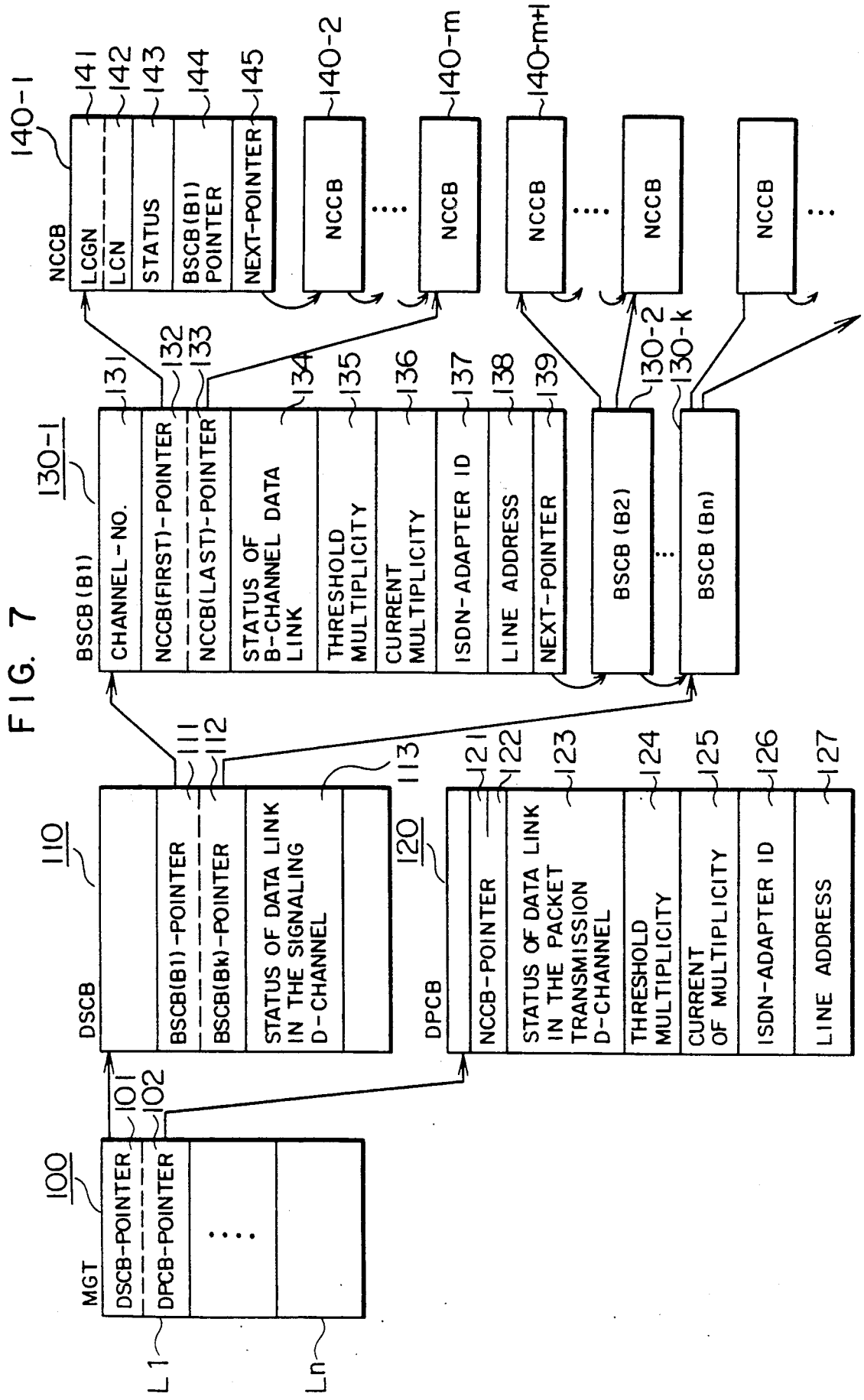
FIG. 7 is a diagram showing control tables which are referred in the data link control.

FIG. 7 shows a construction of a management table which is prepared in the memory 23 and is referred to by the instruction processor upon setting of a call and upon transmission/reception of the packets.

A management table (MGT) 100 has recording areas $L_l$ to $L_n$ corresponding to the subscribers' lines 3-1 to 3-n. Each recording area $L_i$ stores an address pointer 101 to link with a data link connection control table (DSCB) 110 of the D channel ($D_1$) for control signal transmission, and an address pointer 102 to link with a data link connection control table (DPCB) 120 of the D channel ($D_2$) for packet transmission. The DSCB 110 stores a pointer 111 to link with the first control table 130-1 among a plurality of B channel data link connection control tables (BSCB) 130-1 to 130-k which are prepared in correspondence to a plurality of B channels each of which is formed on one subscriber's line, a pointer 112 to link with the last control table 130-k among the control tables (BSCB), and a status 113 of the data link connection of the $D_1$ channel.

Each control table (BSCB) 130-i stores a channel number 131, a pointer 132 to link with the first control table 140-1 among a plurality of control tables (NCCB) 140-1 to 140-m to manage the status of the call (network connection) which was multiplexed to the B channel, a pointer 133 to link with the last control table 140-m among the control tables (NCCB), a status 134 of the data link in the B channel, a threshold value 135 indicative of the upper limit value of the call multiplicity which is permitted for the B channel, a value 136 of the present call multiplicity, an ID 137 of the ISDN adapter 26 to which the B channel belongs, a value 138 of the line address (#X), and a pointer 139 to link with the next control table (BSCB).

Each call (network connection) control table (NCCB) 140 includes a logical channel group number (LCGN) 141, a logical channel number (LCN) 142, a status 143 of the control in the case of the call, a pointer 144 to link with the B channel data link connection control table (BSCB) in which the call (or NCCB) is set, and a pointer 145 to link with the next NCCB.

On the other hand, the $D_2$ channel data link connection control table (DPCB) 120 stores a pointer 121 to link with the first control table 140-P (not shown) among a plurality of control tables (NCCB) to manage the status of the call which was multiplexed to the $D_2$ channel, a pointer 122 to link with the last control table among the control tables (NCCB), a status 123 of the data link in the $D_1$ channel, a threshold value 124 indicative of the upper limit value of the call multiplicity which is permitted for the $D_2$ channel, a value 125 of the present multiplicity, an ID 126 of the ISDN adapter to which the $D_2$ channel belongs, and a line address 127 assigned to the $D_2$ channel.

Figure 8:
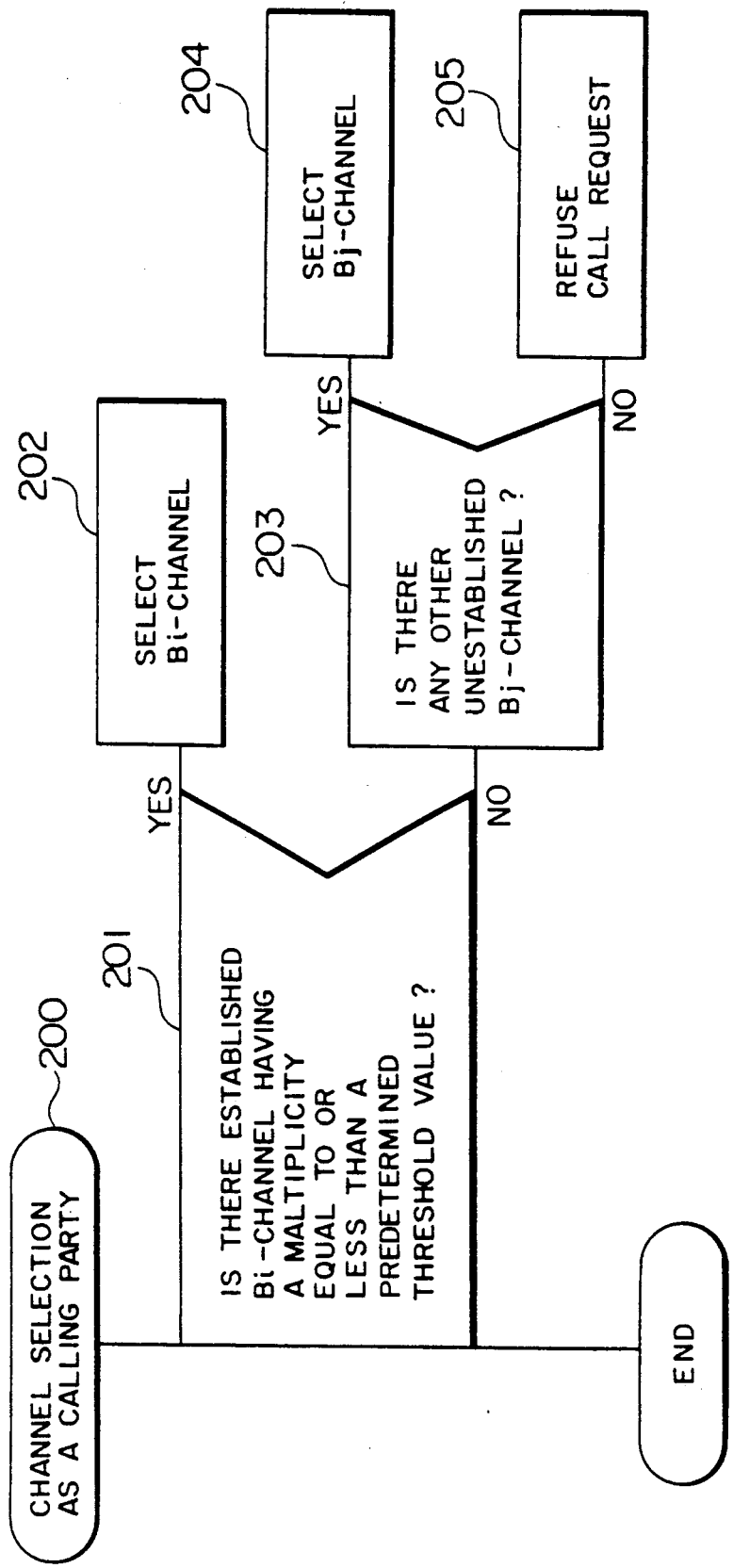
FIG. 8 is a control flowchart for channel selection which is executed by the CCP upon originating call.

FIG. 8 shows a flowchart for a data link control routine 200 which is executed by the CCP 2 to select one B channel to which a call should be multiplexed from among the B channels in response to a call setting request from the CPU 1.

Upon calling, the CCP sequentially refers to the B channel data link connection tables BSCB ($B_1$) 130-1 to BSCB ($B_k$) 130-k and checks to see if a channel (which assumes $B_i$) in which the status 134 of the B channel data link is set into the active state (that is, the state in which the data link has been established between the packet handlers of the CCP and ISDN) and the call multiplicity 136 is equal to or less than the threshold value 135 of the multiplicity exists or not (step 201). If the channel $B_i$ which satisfies such conditions has been found out, it is selected as a channel to which the call should be multiplexed, the new control table NCCB for the above call is linked with the BSCB ($B_i$), and the value of the multiplicity 136 is increased by only "1" (step 202). If a channel $B_i$ which satisfies the above conditions cannot be found, a check is made to see if the control table BSCB ($B_j$) in which the B channel data link status 134 is set into the inactive state exists or not (step 203). If such a BSCB ($B_j$) exists, the call is multiplexed to the channel $B_j$, that is, a new control table NCCB is linked with the BSCB ($B_j$) and the value of the multiplicity 136 of the BSCB ($B_j$) is increased by only "1" (step 203). If a channel $B_j$ cannot be found, a message to refuse the call is sent to the CPU (step 205).

Figure 9:
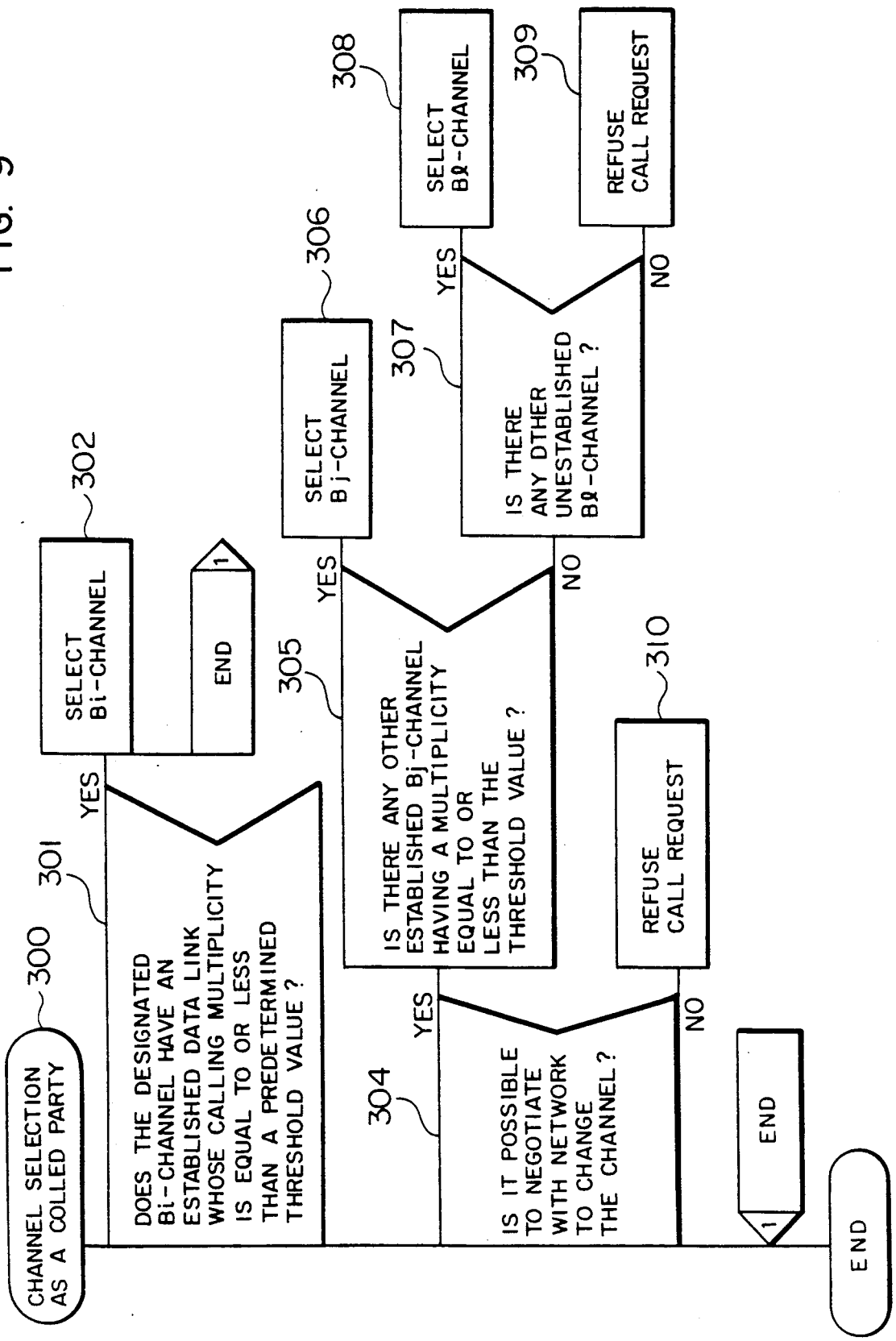
FIG. 9 is a control flowchart for channel selection which is executed by the CCP upon incoming call.

FIG. 9 shows a data link control routine 300 which is executed by the CCP when the call setting message SETUP is received from the ISDN, that is, when the incoming call is received from the terminal equipment.

First, the CCP refers to the control table BSCB ($B_i$) corresponding to the channel $B_i$ designated by the channel ID field 75 of the received SETUP message, thereby checking to see if the data link has already been established in the channel $B_i$ or not and if the call multiplicity in the channel $B_i$ is equal to or less than the threshold value or not (step 301). If the designated channel $B_i$ satisfies the above conditions, the control table NCCB of the call is linked with the control table BSCB ($B_i$) and the value of the multiplicity 136 of the BSCB ($B_i$) is increased by only "1" (step 302).

If the channel $B_i$ does not satisfy the above conditions, a check is made to see if the designated channel $B_i$ can be changed to another B channel or not (step 304). Discrimination information regarding whether the designated channel can be changed or not is included in the field 75 of the SETUP message. If the designated channel can be changed to another B channel, discriminating steps 305 and 307 similar to the steps 201 and 203 in FIG. 8 mentioned above are executed and the data link established channel $B_j$ or the data link unestablished channel $B_l$ is assigned to the call (steps 306 and 308). If the channels $B_j$ and $B_l$ do not exist or if the designated channel cannot be changed, a message to refuse the incoming call is transmitted to the calling terminal equipment (steps 309 and 310).

If the call could be multiplexed to the designated channel $B_i$ or if the call was multiplexed to the changed channel $B_j$ or $B_l$, a CONNECT message to respond to the SETUP message is transmitted to the ISDN in step 58 in FIG. 4. If the incoming call is refused, in place of the CONNECT message, a RELEASE COMPLETE message 90 shown in FIG. 5D is sent. Information indicative of the reason of the refusal of the incoming call is set into a field 79 of the message 90.

If the call was set, a pointer address of the NCCB corresponding to the call is given to the message to the terminal equipment which is transmitted from the CPU to the CCP. When the CCP receives the above message, the CCP obtains the logic channel number (LCGN +LCN) to be assigned to the packet by referring to one NCCB designated by the pointer address. On the other hand, the BSCB table corresponding to the call is accessed from the BSCB pointer 144, thereby obtaining the line address 138 to which the packet should be transmitted.

Another embodiment of the invention in which, in accordance with the maximum packet length which is needed by a new call, the channel to which the call should be multiplexed is selected will now be described.

In the embodiment, when the maximum packet length which is needed by the call is equal to or less than the maximum packet length (256 octets) which can be transmitted by the $D_2$ channel, if the call permits the establishment to the $D_2$ channel and the call multiplicity in the $D_2$ channel is equal to or less than a predetermined value, the call is multiplexed to the $D_2$ channel.

Figure 10:
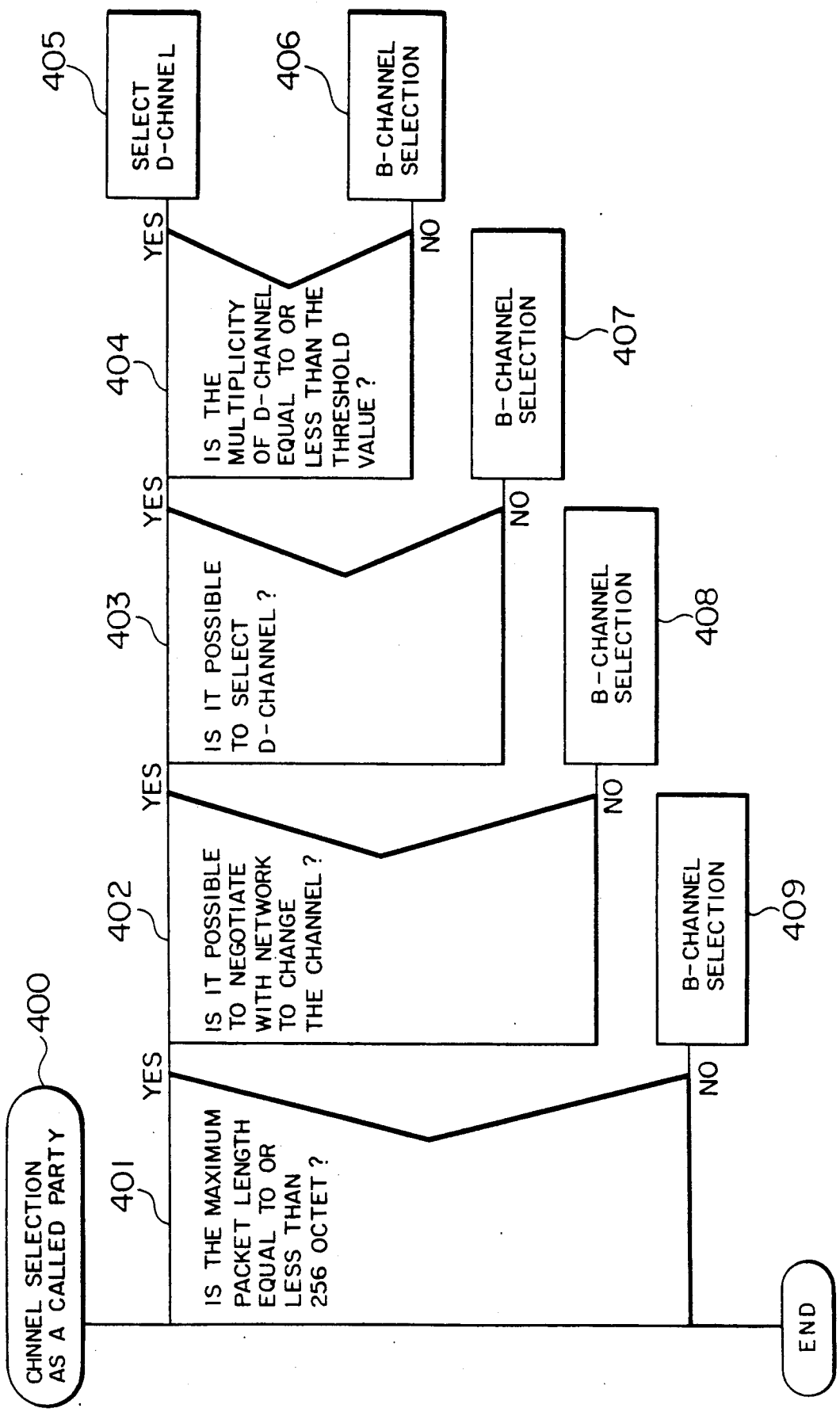
FIG. 10 is a diagram showing another embodiment of a control flowchart for channel selection which is executed by the CCP upon incoming call.

FIG. 10 shows a flowchart for a data link control routine 400 which is executed by the CCP for an incoming call.

Upon reception of the SETUP message from the ISDN, the CCP checks to see if the packet maximum length designated by the field 78 of the SETUP message is 256 octets or less or not (step 401). If the maximum length is larger than 256 octets, the control routine to select the B channel which has been described in FIG. 9 is executed (step 409). If the necessary packet length is equal to 256 octets or less, a check is made to see if channel (ordinarily, B channel) designated by the call can be changed (step 402). If it can be changed, a check is made to see if the $D_2$ channel can be selected (step 403). If the $D_2$ channel can be selected, the present call multiplicity 125 is compared with the multiplicity threshold value 124 by referring to the control table DPCB 120 (step 404). If the call multiplicity 125 is equal to or less than the threshold value 124, the call is multiplexed to the $D_2$ channel (step 405). If NO results in steps 402 to 404, the processing routine to select the B channel is executed (steps 406 to 408) in a manner similar to step 409.

As mentioned above, the packet communication in which the necessary maximum packet length is equal to or shorter than 256 octets is executed by the $D_2$ channel as much as possible and the B channels are assigned to the packet communication in which the necessary packet length is longer than 256 octets. Thus, the occupation of the B channels due to the communication in the packet switching mode can be avoided in a form such that the process to divide the message frame into a plurality of packets and the process to assemble the reception packets to the message frame can be reduced or completely eliminated.

The call multiplicity threshold value (maximum multiplicity m) of the B and $D_2$ channels can be obtained by, for instance, the following method. To simplify the model to obtain the threshold value, it is now assumed that the quality of the subscribers' lines is sufficiently high (retransmission of the frame can be ignored) and the processing time of the data link header in the CCP is enough smaller than the frame transmitting time and can be ignored. It is also assumed that an arrival rate of the packet to each data link is based on the Poisson arrival and the service time of the data link to one packet has an exponential distribution.

In the above case, a utilization p of each channel is obtained by the equation (1).

$$p = 8(l+h)m \cdot r/s \quad (1)$$

where, l denotes a packet length (octets); h indicates a data link header length (octets); m a call multiplicity; r a packet arrival rate (packets/sec) per call; and s a data transfer rate (bits) of each channel.

On the other hand, the number n of transfer waiting packets of each channel is obtained by $$n = p^2/(1-p) \quad (2)$$

Now, assuming that n is set to a fixed value N, the maximum multiplicity m is obtained by the equations (1) and (2).

$$m = s(-N + \sqrt{N^2 + 4N})/16(l+h) \cdot r \quad (3)$$

For instance, it is now assumed that the number N of transfer waiting packets is set to N=1, the packet length l=4096 octets, the header length h=6 octets, the data transfer rate s=64 kbps, and the packet arrival rate r=0.2. The maximum multiplicity m of the B channel is therefore set to m=6.

Although the embodiment in which the data connection control according to the invention is applied to the CCP to which the host CPU is connected has been described above, the invention is not limited to the CCP on the host side but can be also applied to communication control means on the terminal equipment side in which the call (or network connection) is multiplexed.

We claim:

1. A data link control method for communication control means connected through at least one subscriber's line to an integrated services digital network (ISDN) for providing at least one control channel and a plurality of information channels to each subscriber's line, comprising:

a first step of finding, when a call request from a data processor connected to the communication control means or an incoming call request from one of a plurality of terminal means connected to the ISDN is input to the communication control means, an information channel which satisfies such conditions that a data link connection has already been established between the communication control means and the ISDN and a call multiplicity in the information channel is equal to or less than a predetermined threshold value from among a plurality of information channels on the subscribers' lines connecting the communication control means and the ISDN, and setting the call into said information channel thus found;

a second step of finding, when an information channel which satisfies the conditions in said first step is not found, an information channel in which no data link connection is established yet from among the plurality of information channels, and setting the call in said information channel thus found after a data link connection between said communication control means and said ISDN is established in said information channel; and a third step of updating the value of the call multiplicity of the information channel in proportion to a number of calls sharing the information channel.

2. A method according to claim 1, wherein said first and second steps are executed in the case where the call request or the incoming call request requires a network connection for packet communication.

3. A data link control method for communication control means connected through at least one subscriber's line to an integrated services digital network (ISDN) to provide a plurality of information channels and at least one control channel to each subscriber's line, said control channel being constructed by a first control channel for transmitting control signals and a second control channel to transmit information packets, said method comprising:

a first step of comparing, when a call request for packet communication from a data processor connected to said communication control means or an incoming call request from one of a plurality of packet communication apparatuses connected to said ISDN is input to the communication control means, a maximum packet length which is needed by said call with a packet length which can be permitted in said second control channel;

a second step of setting the call into said second control channel if the maximum packet length needed by the call is equal to or less than the packet length permitted in the second control channel, and if a call multiplicity in the second control channel on the subscriber's line connecting the communication control means and the ISDN is equal to or less than a first predetermined threshold value;

a third step of finding, if the maximum packet length needed by the call is larger than the packet length permitted in the second control channel, or if the call multiplicity in the second control channel is larger than said first threshold value, an information channel which satisfies such conditions that a data link connection has already been established between the communication control means and the ISDN and the call multiplicity is equal to or less than a second predetermined threshold value from among a plurality of information channels on the subscribers' lines connecting the communication control means and the ISDN, and setting the call into said information channel thus found;

a fourth step of selecting, if no information channel which satisfies the conditions in said third step is found, an information channel in which no data link connection is established from among a plurality of information channels, and setting the call into said selected information channel after a data link connection between said communication control means and said ISDN is established in said selected information channel; and a fifth step of changing the value of the call multiplicity regarding the second control channel or the information channel in proportion to a number of calls sharing said second control channel or said information channel.

4. A method according to claim 3, wherein in the case where the call request or the incoming call request designates a channel to which the call should be set, said second step includes a stp of discriminating whether the designated channel can be changed to another channel or not, and if it can be changed, the call multiplicity of said second control channel is compared with the first threshold value.

5. A communication control system connected through at least one subscriber's line to integrated services digital network (ISDN) to provide at least one control channel and a plurality of information channels to each subscriber's line, comprising:

at least one ISDN adapter means provided in correspondence to said subscribers' lines;

interface means for communicating with a host apparatus;

processor means for executing a data link control routine in response to a call request from said host apparatus or an incoming call request which is generated from another subscriber's apparatus connected to the ISDN and is received by the ISDN adapter means through the control channel on the subscriber's line; and memory means for storing management information of each of the control channel and the information channels on the subscribers' lines, in which the status of a data link connection on a channel, a current value of a multiplicity of a call which has been set in the channel, and a predetermined multiplicity threshold value which can be permitted on the channel are stored in said memory means for each of the control channel and the information channels, wherein when said processor means receives the call request or incoming call request for packet communication, the processor means finds an information channel in which a data link connection has already been established between the communication control means and the ISDN and the current call multiplicity value is equal to or less than the threshold value by referring to management information in said memory means and sets the call into said information channel thus found.

6. A system according to claim 5, further comprising:

means for comparing a maximum packet length designated by the call request or incoming call request and an allowable packet length in a packet communication which is executed on said control channel; and means for setting a call into the control channel if a channel designated by the call request or incoming call request can be changed and the current call multiplicity value in the control channel is equal to or less than the threshold value when it is determined by said comparing means that the designated maximum packet length is equal to or less than the allowable packet length.

* * * * *